US007008312B2

(12) United States Patent
Laubender et al.

(10) Patent No.: US 7,008,312 B2
(45) Date of Patent: Mar. 7, 2006

(54) USING AQUEOUS BINDERS IN PRODUCING ABRASIVE MATERIALS

(75) Inventors: Matthias Laubender, Schifferstadt (DE); Matthias Gerst, Neustadt (DE); Bernd Reck, Gruenstadt (DE); Manfred Weber, Mannheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/759,240

(22) Filed: Jan. 20, 2004

(65) Prior Publication Data

US 2004/0236008 A1 Nov. 25, 2004

(30) Foreign Application Priority Data

Feb. 6, 2003 (DE) ................ 103 04 958

(51) Int. Cl.
*C08L 33/03* (2006.01)
*C09D 133/02* (2006.01)
*A47L 13/16* (2006.01)
*B24D 3/28* (2006.01)

(52) U.S. Cl. .......... 451/539; 51/295; 510/395; 524/460; 524/558; 526/201; 526/203

(58) Field of Classification Search ........ 451/539; 51/295; 510/395; 524/558, 460; 526/201, 526/203

See application file for complete search history.

(56) References Cited

U.S. PATENT DOCUMENTS 3,813,231 A * 5/1974 Gilbert et al. ............ 51/298

| 4,457,766 A | 7/1984 | Caul |
| 5,277,708 A * | 1/1994 | Stuart, Jr. .................. 106/8 |
| 6,071,994 A | 6/2000 | Hummerich et al. |

FOREIGN PATENT DOCUMENTS

| EP | 0 141 863 A1 | 5/1985 |
| EP | 0 261 098 A2 | 3/1988 |
| EP | 0 445 578 A2 | 9/1991 |
| EP | 0 552 698 A2 | 7/1993 |
| EP | 0 583 086 A1 | 2/1994 |
| EP | 199 49 592 A1 | 4/2001 |
| WO | WO 97/31036 | 8/1997 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The present invention relates to the use of an aqueous polymer dispersion comprising dispersed particles of at least one polymer A1 having a glass transition temperature, Tg, of from −20° C. to +35° C. and obtainable through free-radical emulsion polymerization in the presence of a polymer A2 synthesized from
   from 50 to 99.5% by weight of at least one ethylenically unsaturated monocarboxylic and/or dicarboxylic acid whose carboxylic groups can form an anhydride group, or mixtures thereof,
   from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, and
   up to 20% by weight of at least one further monomer
as binder for producing abrasive material.

25 Claims, No Drawings

USING AQUEOUS BINDERS IN PRODUCING ABRASIVE MATERIALS

The present invention relates to the use of an aqueous polymer dispersion comprising dispersed particles of at least one polymer A1 having a glass transition temperature, Tg, of from −20° C. to +35° C. and obtainable through free-radical emulsion polymerization in the presence of a polymer A2 synthesized from from 50 to 99.5% by weight of at least one ethylenically unsaturated monocarboxylic and/or dicarboxylic acid, from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, and up to 20% by weight of at least one further monomer as binder for producing abrasive material.

The consolidation of sheetlike structures, such as fiber webs, swellable webs, or papers, or of formed articles, such as fiberboard or chipboard, is often accomplished chemically using a polymeric binder. The polymeric binders can be used inter alia in the form of an aqueous solution or of an aqueous dispersion.

EP-A-445 578 discloses sheets of finely divided materials, such as glass fibers, in which mixtures of high molecular mass polycarboxylic acids and polyhydric alcohols, alkanolamines or polyfunctional amines act as binders.

EP-A-583 086 discloses, for example, aqueous binders for producing fiber webs, especially glass fiber webs. The binders comprise a polycarboxylic acid having at least two carboxylic groups and also, possibly, anhydride groups, and a polyol. These binders require a phosphorus reaction accelerant in order to achieve adequate glass fiber web strengths. It is pointed out that a reaction accelerant of this kind can only be omitted if a highly reactive polyol is used. As highly reactive polyols reference is made to β-hydroxyalkylamides.

EP-A 882 074 describes formed article binders composed of a free-radical polymer of an unsaturated acid anhydride or of an unsaturated dicarboxylic acid and an alkanolamine. Binders of this kind are applied to fiber webs, among other substrates, and then used as roofing sheets.

EP-A 882 074 does not disclose, how ver, using the binders described therein in the production of abrasive materials.

In the production of abrasive materials, particularly abrasive papers or abrasive cloths, current practice is to use, in particular, binders based on skin glue, bone glue or formaldehyde resins. Since such binders generally lead to hard and brittle abrasive materials, demand is increasing for abrasive material binders having flexible, toughened elastic properties while nevertheless ensuring effective incorporation of the abrasive grain.

DE-A 19949592 pertains to aqueous polymer dispersions comprising particles of at least one polymer obtainable by free-radical emulsion polymerization in the presence of a further polymer composed inter alia of ethylenically unsaturated monocarboxylic and/or dicarboxylic acids. For the polymers obtained by free-radical emulsion polymerization, glass transition temperatures, Tg, in the range from −60° C. to +150° C. are reported. One of the possible applications of the aqueous polymer dispersions described in this laid-open specification is the production of abrasive paper and abrasive products. The abrasive materials thus obtained, however, are still improvable in terms of their flexibility, toughness/elasticity, abrasion behavior, breaking force, and grain binding capacity.

It is an object of the present invention to remedy the disadvantages depicted and to provide an improved binder for abrasive materials which among other qualities feature high flexibility, toughness/elasticity, and breaking force, exhibit favorable abrasion behavior, and yet have firm incorporation of the abrasive grit, corundum or quartz for example.

We have found that this object is achieved by the use of an aqueous polymer dispersion comprising dispersed particles of at least one polymer A1 having a glass transition temperature, Tg, of from −20° C. to +35° C. and obtainable through free-radical emulsion polymerization in the presence of a polymer A2 synthesized from from 50 to 99.5% by weight of at least one ethylenically unsaturated monocarboxylic and/or dicarboxylic acid whose carboxylic groups can form an anhydride group, or mixtures thereof, from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, and up to 20% by weight of at least one further monomer as binder for producing abrasive material.

In connection with the monomer components of the polymer A1 alkyl below is preferably a straight-chain or branched $C_1$–$C_{22}$ alkyl radical, especially $C_1$–$C_{12}$ and, with particular preference, $C_1$–$C_6$ alkyl, such as methyl, ethyl, n-propyl, n-butyl, sec-butyl, tert-butyl, n-pentyl, n-hexyl, 2-ethylhexyl, n-dodecyl or n-stearyl.

Hydroxyalkyl is preferably hydroxy-$C_1$–$C_6$ alkyl, it being possible for the alkyl to be straight-chain or branched, and especially is 2-hydroxyethyl, 2- or 3-hydroxypropyl, 2-methyl-2-hydroxypropyl or 4-hydroxybutyl.

Cycloalkyl is preferably $C_5$–$C_7$ cycloalkyl, especially cyclopentyl and cyclohexyl.

Aryl is preferably phenyl or naphthyl.

The polymer A1 is a free-radical emulsion polymer. Its preparation can be effected using all monomers polymerizable by free-radical polymerization. In general the polymer is synthesized from from 80 to 100% by weight, preferably from 85 to 99.9% by weight, based on the total weight of the monomers for the polymer, of at least one ethylenically unsaturated principal monomer and from 0 to 20% by weight, preferably from 0.1 to 15% by weight, based on the total weight of the monomers for the polymer, of at least one ethylenically unsaturated comonomer.

The principal monomer is preferably selected from esters of preferably $C_3$ to $C_6$ α,β-monoethylenically unsaturated monocarboxylic or dicarboxylic acids, such as acrylic acid, methacrylic acid, maleic acid, fumaric acid, and itaconic acid, with $C_1$–$C_{12}$, preferably $C_1$–$C_8$, alkanols. Such esters are in particular methyl, ethyl, n-butyl, isobutyl, tert-butyl, n-pentyl, isopentyl, and 2-ethylhexyl acrylate and/or methacrylate, and mixtures thereof;

vinylaromatic compounds, preferably styrene, α-methylstyrene, o-chlorostyrene, vinyltoluenes, and mixtures thereof;

vinyl esters of $C_1$–$C_{18}$ monocarboxylic or dicarboxylic acids, such as vinyl acetate, vinyl propionate, vinyl n-butyrate, vinyl laurate and/or vinyl stearate;

butadiene;

linear 1-olefins, branched-chain 1-olefins or cyclic olefins, such as ethene, propene, butene, isobutene, pentene, cyclopentene, hexene or cyclohexene, for example. Also suitable are oligoolefins prepared by metallocene catalysis and having a terminal double bond, such as oligopropene or oligohexene, for example.

acrylonitrile, methacrylonitrile;

vinyl and allyl alkyl ethers with 1 to 40 carbon atoms in the alkyl radical, it being possible for said alkyl radical to carry further substituents, such as one or more hydroxyl groups, one or more amino or diamino groups or one or more alkoxylate groups, such as, for example, methyl vinyl ether, ethyl vinyl ether, propyl vinyl ether, and 2-ethylhexyl vinyl ether, isobutyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino) ethyl vinyl ether, methyldiglycol vinyl ether, and the corresponding allyl ethers, and mixtures thereof.

Particularly preferred principal monomers are styrene, methyl methacrylate, n-butyl acrylate, ethyl acrylate, 2-ethylhexyl acrylate, vinyl acetate, ethene, and butadiene.

The comonomer is preferably selected from ethylenically unsaturated monocarboxylic or dicarboxylic acids or their anhydrides, preferably acrylic acid, methacrylic acid, methacrylic anhydride, maleic acid, maleic anhydride, fumaric acid and/or itaconic acid;

acrylamides and alky-substituted acrylamides, such as acrylamide, methacrylamide, N,N-dimethylacrylamide, N-methylolmethacrylamide, N-tert-butylacrylamide, N-methylmethacrylamide, and mixtures thereof;

monomers containing sulfo groups, such as allysulfonic acid, methallylsulfonic acid, styrenesulfonic acid, vinysulfonic acid, 2-acrylamido-2-methylpropanesulfonic acid, allyloxybenzenesulfonic acid, the corresponding alkali metal salts or ammonium salts of acids, and mixtures thereof, and also sulfopropyl acrylate and/or sulfopropylmethacrylate;

$C_1$–$C_4$ hydroxyalkyl esters of $C_3$–$C_6$ monocarboxylic or dicarboxylic acids, especially of acrylic acid, methacrylic acid or maleic acid, or derivatives thereof alkoxylated with from 2 to 50 mol of ethylene oxide, propylene oxide, butylene oxide or mixtures thereof, or esters of $C_1$–$C_{18}$ alcohols alkoxylated with from 2 to 50 mol of ethylene oxide, propylene oxide, butylene oxide or mixtures thereof with the abovementioned acids, such as hydroxyethyl acrylate, hydroxyethyl methacrylate, hydroxypropyl acrylate, hydroxypropyl methacrylate, butane-1,4-diol monoacrylate, ethyldiglycol acrylate, methylpolyglycol acrylate (11 EO), (meth)acrylic esters of $C_{13}/C_{15}$ oxo alcohol reacted with 3, 5, 7, 10 or 30 mol of ethylene oxide, and mixtures thereof;

vinylphosphonic acids and their salts, dimethyl vinylphosphonate, and other phosphorus monomers;

alkylaminoalkyl (meth)acrylates or alkylaminoalkyl (meth)acrylamides or their quaternization products, such as 2-(N,N-dimethylamino)ethyl (meth)acrylate or 2-(N,N,N-trimethylammonio)ethyl methacrylate chloride, 3-(N,N-dimethylamino)propyl (meth)acrylate, 2-dimethylaminoethyl(meth)acrylamide, 3-dimethylaminopropyl(meth)acrylamide, 3-trimethylammoniopropyl(meth)acrylamide chloride, and mixtures thereof;

allyl esters of $C_1$–$C_{30}$ monocarboxylic acids;

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, 2-vinylpyridine, 4-vinylpyridine, N-vinylcarbazole and/or N-vinylcaprolactam;

diallyidimethylammonium chloride, vinylidene chloride, vinyl chloride, acrolein, methacrolein;

monomers containing 1,3-diketo groups, such as acetoacetoxyethyl (meth)acrylate or diacetoneacrylamide, for example, monomers containing urea groups, such as ureidoethyl (meth)acrylate, acrylamidoglycolic acid, methacrylamidoglycolate methyl ether;

monomers containing silyl groups, such as trimethoxysilylpropyl methacrylate;

monomers containing glycidyl groups, such as glycidyl methacrylate.

Particularly preferred comonomers are n-butyl acrylate, n-butyl methacrylate, hydroxyethyl acrylate, hydroxypropyl acrylate, hydroxybutyl acrylate, hydroxyethyl methacrylate, and mixtures thereof. Special prefer nce is given to n-butyl acrylate and hydroxyethyl acrylate, particularly in amounts of from 2 to 50% by weight, based on the overall polymer A1. As polymer A1 it is particularly preferred to use a copolymer of styrene, n-butyl acrylate, and, if desired, hydroxyethyl acrylate as well.

The polymer A2 contains from 50 to 99.5% by weight, preferably from 70 to 99% by weight, of incorporated structural elements deriving from at least one ethylenically unsaturated monocarboxylic or dicarboxylic acid. If desired these acids may also be present in whole or in part in the form of a salt in the polymer. The acidic form is preferred.

The solubility of the polymer A2 in water (at 25° C.) is preferably more than 10 g/l.

Useful ethylenically unsaturated carboxylic acids have already been mentioned above in connection with the polymer A1. Preferred carboxylic acids are $C_3$ to $C_{10}$ monocarboxylic acids and $C_4$ to $C_8$ dicarboxylic acids, particularly acrylic acid, methacrylic acid, crotonic acid, fumaric acid, maleic acid, 2-methylmaleic acid and/or itaconic acid. Particular preference is given to acrylic acid, methacrylic acid, maleic acid, and mixtures thereof. In the preparation of the polymer A2 it is of course also possible to use, instead of or together with the acids, their anhydrides, such as maleic, acrylic or methacrylic anhydride.

The polymer A2 contains further in copolymerized form from 0.5 to 50% by weight, preferably from 1 to 30% by weight, of at least one ethylenically unsaturated compound selected from the esters of ethylenically unsaturated monocarboxylic acids and the monoesters and diesters of ethylenically unsaturated dicarboxylic acids with at least one hydroxyl-containing amine.

The polymer A2 is preferably in the form of a comb polymer having covalently bonded amine side chains.

Monocarboxylic acids possessing suitability as components of the esters are the aforementioned $C_3$ to $C_{10}$ monocarboxylic acids, especially acrylic acid, methacrylic acid, and crotonic acid, and mixtures thereof.

Dicarboxylic acids possessing suitability as components of the monoesters and diesters are the aforementioned $C_4$ to $C_8$ dicarboxylic acids, especially fumaric acid, maleic acid, 2-methylmaleic acid, and itaconic acid, and mixtures thereof.

The amine having at least one hydroxyl group is preferably selected from secondary and tertiary amines containing at least one $C_6$ to $C_{22}$ alkyl, $C_6$ to $C_{22}$ alkenyl, aryl-$C_6$ to $C_{22}$ alkyl or aryl-$C_6$ to $C_{22}$ alkenyl radical, the alkenyl group having 1, 2 or 3 nonadjacent double bonds.

The amine is preferably hydroxyalkylated and/or alkoxylated. Alkoxylated amines preferably have one or two alkylene oxide radicals with terminal hydroxyl groups. The alkylene oxide radicals preferably have each from 1 to 100, more preferably each from 1 to 50, identical or different alkylene oxide units, randomly distributed or in the form of blocks. Preferred alkylene oxides are ethylene oxide, propylene oxide and/or butylene oxide. Ethylene oxide is especially preferred.

The polymer A2 preferably incorporates an unsaturated compound based on an amine component containing at least one amine of the formula (I)

$$R^c NR^a R^b \quad (I)$$

where
$R^c$ is $C_6$ to $C_{22}$ alkyl, $C_6$ to $C_{22}$ alkenyl, aryl-$C_6$–$C_{22}$ alkyl or aryl-$C_6$–$C_{22}$ alkenyl, the alkenyl radical having 1 or 2 or 3 nonadjacent double bonds,
$R^a$ is hydroxy-$C_1$–$C_6$ alkyl or a radical of the formula II $$-(CH_2CH_2O)_x(CH_2CH(CH_3)O)_y-H \quad (II)$$

where
in the formula II the sequence of the alkylene oxide units is arbitrary and x and y independently of each other are an integer from 0 to 100, preferably from 0 to 50, the sum of x and y being >1,
$R^b$ is hydrogen, $C_1$ to $C_{22}$ alkyl, hydroxy-$C_1$–$C_6$ alkyl, $C_6$ to $C_{22}$ alkenyl, aryl-$C_6$–$C_{22}$ alkyl, aryl-$C_6$–$C_{22}$ alkenyl or $C_5$ to $C_8$ cycloalkyl, the alkenyl radical having 1 or 2 or 3 nonadjacent double bonds,
or Rb is a radical of the formula III $$-(CH_2CH_2O)_v(CH_2CH(CH_3)O)_w-H \quad (III)$$

where
in the formula III the sequence of the alkylene oxide units is arbitrary and v and w independently of each other are an integer from 0 to 100, preferably from 0 to 50.

$R^c$ is preferably $C_8$ to $C_{20}$ alkyl or $C_8$ to $C_{20}$ alkenyl, the alkenyl radical having 1, 2 or 3 nonadjacent double bonds. With preference $R^c$ is the hydrocarbon radical of a saturated or mono- or polyunsaturated fatty acid. Preferred radicals $R^c$ are, for example, n-octyl, ethylhexyl, undecyl, lauryl, tridecyl, myristyl, pentadecyl, palmityl, margarinyl, stearyl, palmitoleyl, oleyl, and linoleyl.

With particular preference the amine component is an alkoxylated fatty amine or alkoxylated fatty amine mixture. The ethoxylates are particular preferred. Use if made in particular of alkoxylates of amine based on naturally occurring fatty acids, such as tallow fatty amines, for example, which contain predominantly saturated and unsaturated $C_{14}$, $C_{16}$, and $C_{18}$ alkylamines, or cocoamines, containing saturated, monounsaturated, and diunsaturated $C_6$–$C_{22}$, preferably $C_{12}$–$C_{14}$ alkylamines. Examples of amine mixtures suitable for alkoxylation are various Armeen® grades from Akzo or Noram® grades from Ceca.

Suitable alkoxylated amines available commercially are, for example, the Noramox® grades from Ceca, preferably ethoxylated oleylamines, such as Noramox® 05 (5 EO units), and the BASF AG products sold under the brand name Lutensol® FA.

Copolymerization of the aforementioned esters, monoesters, and diesters generally has the effect of producing pronounced stabilization of the polymer dispersions for use in accordance with the invention. These dispersions reliably retain the colloidal stability of their latex particles on dilution with water or dilute electrolytes or surfactant solutions.

The esterification to prepare the afore-described esters, monoesters, and diesters takes place in accordance with customary methods known to the skilled worker. To prepare esters of unsaturated monocarboxylic acids the free acids or suitable derivatives, such as anhydrides, halides, e.g., chlorides, and ($C_1$ to $C_4$) alkyl esters, can be used. Monoesters of unsaturated dicarboxylic acids are preferably prepared from the corresponding dicarboxylic anhydrides. The reaction takes place preferably in the presence of a catalyst, such as a dialkyl titanate or an acid, such as sulfuric acid, toluenesulfonic acid or methanesulfonic acid, for example. The reaction takes place in general at temperatures from 60 to 200° C. In one suitable embodiment the reaction takes place in the presence of an inert gas, such as nitrogen. Water formed in the course of the reaction can be removed by appropriate measures, such as by distillation, from the reaction mixture. The reaction may where desired take place in the presence of customary polymerization inhibitors. The esterification reaction can be conducted to substantial completion or only up to a partial conversion. If desired, one of the ester components, preferably the hydroxyl-containing amine, can be employed in excess. The extent of esterification can be determined by means of infrared spectroscopy.

In one preferred embodiment the unsaturated esters, monoesters or diesters are prepared and reacted further to the polymers A2 used in accordance with the invention without the esters being isolated between said preparation and further reaction, which are preferably conducted one after the other in the same reaction vessel.

To prepare the polymers A2 it is preferred to use a reaction product of a dicarboxylic anhydride, preferably maleic anhydride, and one of the afore-described hydroxyl-containing amines.

Besides the carboxylic acid and ester, monoester and/or diester constituents the polymer A2 may further contain in copolymerized form from 0 to 20% by weight, preferably from 0.1 to 10% by weight, of other monomers. Useful monomers are those specified in connection with the polymer A1, particular preference being given to vinylaromatics, such as styrene, olefins, such as ethylene, or (meth)acrylic esters such as methyl (meth)acrylate, ethyl (meth)acrylate, n-butyl (meth)acrylate, 2-ethylhexyl (meth)acrylate, and mixtures thereof.

The polymers A2 are prepared preferably by free-radical polymerization in bulk or in solution. Suitable solvents for the solution polymerization are, for example, water, water-miscible organic solvents, such as alcohols and ketones, for example methanol, ethanol, n-propanol, isopropanol, n-butanol, acetone, methyl ethyl ketone, etc., and mixtures thereof. Examples of suitable polymerization initiators include peroxides, hydroperoxides, peroxodisulfates, percarbonates, peroxoesters, hydrogen peroxide, and azo compounds, as described in more detail below for the preparation of the polymer dispersions. The polymers A2 can be prepared separately if desired and purified and/or isolated by a conventional method. It is preferred to prepare the polymers A2 immediately before preparing the polymer dispersions for use in accordance with the invention, and to use them without interim isolation for the dispersion polymerization.

The polymers A2 can also be prepared with advantage by polymer-analogous reaction. This can be done by reacting a polymer incorporating from 80 to 100% by weight of at least one ethylenically unsaturated monocarboxylic and/or dicarboxylic acid and from 0 to 20% by weight of the aforementioned other polymers with at least one hydroxyl-containing amine.

Suitable ethylenically unsaturated monocarboxylic and dicarboxylic acids are those specified above as components of the polymers A1 and A2. Suitable amines containing at least one hydroxyl group are again those specified above. In the polymer used for the polymer-analogous reaction the acids may if desired be present in whole or in part in the form of a derivative, preferably a $C_1$ to $C_6$ alkyl ester.

Preparing the polymers A2 by polymer-analogous reaction is effected preferably in a suitable nonaqueous solvent or in bulk. In the case of reaction in bulk the amine component can be used if desired in excess, so as to act as solvent. Preferred solvents are those which form an azeotrope with water and so make it easy to remove the water formed in the course of the reaction. The reaction takes place preferably in the presence of an esterification catalyst, as described above. The reaction temperature is preferably in a range from 100 to 200° C. Water formed in the course of the reaction can be removed by appropriate measures, such as by distillation, for example.

The weight ratio of polymer A1 to polymer A2, based on solids, is preferably in the range from 7:1 to 1:7, in particular from 3:1 to 1:3.

Besides the polymers A1 and A2 the latices of the invention can also contain from 0 to 50% by weight, preferably from 0.1 to 40% by weight, based on the polymer A2, of at least one surface-active, alkoxylated—preferably ethoxylated or propoxylated—alkylamine. Preferred alkylamines are those of the formula $R^cNR^aR^b$, as defined above, which are also present in the polymer A2, particular preference being given to alkylamines of the formula

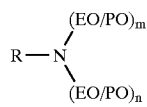

where R is an alkyl, alkenyl or alkylvinyl radical having at least 6 carbon atoms and m and n independently of each other are >1. Preferred radicals R have 8 to 22 carbon atoms.

The alkoxylated alkylamines contained in the polymer A2 and the additional alkylamine crosslinkers can be the same or different compounds.

The polymer dispersion for use in accordance with the invention may if desired comprise further crosslinkers, such as an amine or amide crosslinker having at least two hydroxyl groups. Suitable crosslinkers are especially the alkanolamines disclosed in DE-A 197 29 161, which are hereby made—by reference—part of the disclosure content of the present invention.

Suitable crosslinkers with further preference are β-hydroxyalkylamines of the formula

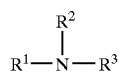

where $R^1$ is a hydrogen atom, a $C_1$ to $C_{10}$ alkyl group, a $C_1$ to $C_{10}$ hydroxyalkyl group or a radical of the formula IV

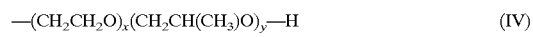

where in the formula IV the sequence of the alkylene oxide units is arbitrary and x and y independently of one another are an integer from 0 to 100, the sum of x and y being >1, and $R^2$ and $R^3$ independently of one another are a $C_1$ to $C_{10}$ hydroxyalkyl group.

More preferably $R^2$ and $R^3$ independently of one another are a $C_2$ to $C_5$ hydroxyalkyl group and $R^1$ is a hydrogen atom, a $C_1$ to $C_5$ alkyl group or a $C_2$ to $C_5$ hydroxyalkyl group.

Particular preference is given to diethanolamine, triethanolamine, diisopropanolamine, triisopropanolamine, methyldiethanolamine, butyldiethanolamine, and methyldiisopropanolamine, especially triethanolamine.

Further preferred β-hydroxyalkylamines are the amines disclosed as component A in DE-A 196 21 573, which are hereby made—by reference—part of the disclosure content of the present invention. They include preferably linear or branched aliphatic compounds containing per molecule at least two functional amino groups of type (a) or (b)

in which R is hydroxyalkyl and $R^1$ is alkyl, preferably a compound of the formula I

in which

A is $C_2$–$C_{18}$ alkylene which is unsubstituted or substituted by one or more groups selected independently of one another from alkyl, hydroxyalkyl, cycloalkyl, OH, and $NR^6R^7$ where $R^6$ and $R^7$ independently of one another are H, hydroxyalkyl or alkyl, and which is uninterrupted or interrupted by one or more oxygen atoms and/or groups $NR^5$ in which $R^5$ is H, hydroxyalkyl, $(CH_2)_nNR^6R^7$ in which n is 2 to 5 and $R^6$ and $R^7$ are as defined above, or alkyl, which in turn can be interrupted by one or groups $NR^5$ in which $R^5$ is as defined above and/or substituted by one or more groups $NR^6R^7$ in which $R^6$ and $R^7$ are as defined above;

or A is a radical of the formula

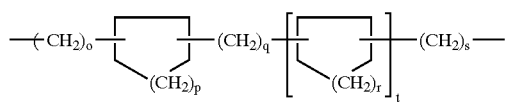

in which o, q and s independently of one another are 0 or an integer from 1 to 6, p and r independently of one another are 1 or 2, and t is 0, 1 or 2, it being possible for the cycloaliphatic radicals also to be substituted by 1, 2 or 3 alkyl radicals, and $R^1$, $R^2$ and $R^3$ and $R^4$ independently of one another are hydrogen, hydroxyalkyl, alkyl or cycloalkyl.

Preferred β-hydroxyalkylamines having greater functionality are in particular at least diethoxylated amines having a molar weight of below 1000 g/mol, such as diethanolamine, triethanolamine, and ethoxylated diethylenetriamine, preferably stoichiometrically ethoxylated diethylenetriamine, i.e., diethylenetriamine in which all of the NH hydrogen atoms are on average monoethoxylated.

Highly suitable addition crosslinkers are also β-hydroxyalkylamides, preferably the β-hydroxyalkylamides specified in U.S. Pat. No. 5,143,582 of the formula

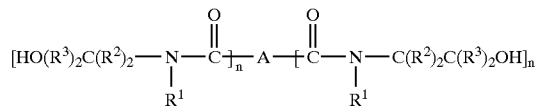

Particular preference is given to the β-hydroxyalkylamides of the above formula in which $R^1$ is hydrogen, a short-chain alkyl group or $HO(R^3)_2C(R^2)_2C-$, n and n' are each 1, -A- is a $-(CH_2)_m-$ group, m is 0 to 8, preferably 2 to 8, $R^2$ in each case is hydrogen, and one of the $R^3$ groups in each case is hydrogen and the others are hydrogen or $C_1-C_5$ alkyl. Bis[N,N-di(2-hydroxyethyl)]adipamide is especially preferred.

The addition of the crosslinker generally has the effect of improving the curing of the compositions for use in accordance with the invention at a given curing temperature or of allowing curing at a lower temperature for a given curing time. The weight fraction of the crosslinker relative to the sum of polymer A1 and A2 is from 0 to 50% by weight, preferably from 0.1 to 30% by weight.

The polymer dispersions for use in accordance with the invention may also have a reaction accelerator added to them. Preferred such accelerators are phosphorus compounds, especially hypophosphorous acid and its alkali metal and alkaline earth metal salts, or alkali metal tetrafluoroborates. Additionally, salts of Mn(II), Ca(II), Zn(II), Al(III), Sb(III) or Ti(IV) or strong acids, such as para-toluenesulfonic acid, trichloroacetic acid, and chlorosulfonic acid, can be added as reaction accelerators. The weight fraction of the reaction accelerator relatively to the sum of polymer A1 and A2 is from 0.1 to 5% by weight, preferably from 0.1 to 2% by weight.

Particularly preferred compositions of the polymer dispersions for use in accordance with the invention are 70 to 45% by weight polymer A1, 25 to 45% by weight polymer A2, and, if desired, 0 to 10% by weight surface-active alkoxylated alkylamine, 0 to 30% by weight hydroxyl-containing crosslinker, 0 to 5% by weight reaction accelerator.

With particular preference the weight % ratio of polymer A1 to polymer A2 in the polymer dispersion is 50:50.

The polymer dispersion for use in accordance with the invention is prepared preferably by aqueous emulsion polymerization, for which a batch, semicontinuous or continuous procedure is possible. It has proven advantageous to meter the polymer A2 into the reaction vessel in the form of an emulsion feed together with the monomers of the polymer A1. If desired the monomers which form polymer A1, and the polymer A2, can be supplied to the reaction vessel in whole or in part by way of two or more separate feeds. The monomers can be supplied to the reaction vessel either preemulsified or without prior emulsification. In one preferred embodiment at least part of the polymer A2 is supplied to the reaction vessel together with at least one monomer component of A1. All or some of the polymer A2 can be used as an initial reactor charge. Using a defined amount of a seed latex as initial reactor charge is advantageous for the polymer dispersions for use in accordance with the invention, for the setting of a specific particle size distribution. In this case from 0 to 25% by weight, preferably from 0.1 to 10% by weight, based on the polymer A1, of a suitable seed latex can be used.

The polymer dispersion is generally prepared in water as dispersing medium. Alternatively it is possible for water-miscible organic solvents, such as alcohols and ketones, e.g., methanol, ethanol, n-propanol, isopropanol, n-butanol, acetone or methyl ethyl ketone, to be present in a fraction of up to approximately 30% by volume.

The polymer A1 accordingly is prepared by aqueous emulsion polymerization in the presence of a polymer A2 and, where present, preferably in the presence of a surface-active amine, as described above.

The polymerization is conducted preferably in the presence of compounds which form free radicals (initiator compounds). The amount required of these compounds is preferably from 0.05 to 10%, more preferably from 0.2 to 5%, by weight based on the monomers used for the polymerization.

Examples of suitable polymerization initiators are peroxides, hydroperoxides, peroxodisulfates, percarbonates, peroxoesters, hydrogen peroxide, and azo compounds. Examples of initiators, which may be soluble or else insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium, and ammonium peroxodisulfate, azodiisobutyronitrile, 2,2'-azobis(2-amidinopropane) dihydrochloride, 2-(carbamoylazo)isobutyronitrile, and 4,4-azobis (4-cyanovaleric acid). The known redox initiator systems as well, such as $H_2O_2$/ascorbic acid or t-butyl hydroperoxide/sodium hydroxymethanesulfinate, can be used as polymerization initiators.

The initiators can be employed alone or in a mixture with one another, an example being mixtures of hydrogen peroxide and sodium peroxodisulfate. For polymerization in aqueous medium it is preferred to use water-soluble initiators.

In order to prepare polymers having a low average molecular weight it is often advantageous to carry out the copolymerization in the presence of regulators. For this purpose it is possible to use customary regulators, such as organic SH-containing compounds, for example, such as 2-mercaptoethanol, 2-mercaptopropanol, mercaptoacetic acid, tert-butyl mercaptan, n-octyl mercaptan, n-dodecyl mercaptan, and tert-dodecyl mercaptan, hydroxylammonium salts such as hydroxylammonium sulfate, formic acid, sodium bisulfite or isopropanol. The polymerization regulators are used generally in amounts of from 0.05 to 5% by weight, based on the monomers.

In order to prepare copolymers of high molecular mass it is often advantageous to operate in he presence of crosslinkers during the polymerization. Such crosslinkers are compounds having two or more ethylenically unsaturated groups, such as, for example, diacrylates or dimethacrylates of at least dihydric saturated alcohols, such as, for example, ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentylglycol diacrylate, neopentylglycol dimethacrylate, 3-methylpentanediol diacrylate, and 3-methylpentanediol dimethacrylate. The acrylic and methacrylic esters of alcohols having more than 2 OH groups can also be used as crosslinkers, e.g., trimethylolpropane triacrylate or trimethylolpropane trimethacrylate. Another class of crosslinkers are diacrylates or dimethacrylates of polyethylene glycols or polypropylene glycols having molecular weights of in each case from 200 to 9000.

Aside from the homopolymers of ethylene oxide or propylene oxide it is also possible to use block copolymers of ethylene oxide and propylene oxide or copolymers of ethylene oxide and propylene oxide containing the ethylene oxide and propylene oxide units distributed randomly. The oligomers of ethylene oxide or propylene oxide are also suitable for preparing the crosslinkers, e.g., diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylene bis(meth)acrylamide, divinylethyleneurea, divinylpropyleneurea, divinylbenzene, divinyidioxane, triallyl cyanurate, tetraallylsilane, tetravinylsilane, and bis- or polyacrylosiloxanes (e.g., Tegomers® from Th. Goldschmidt AG). The crosslinkers are used preferably in amounts of from 10 ppm to 5% by weight, based on the monomers to be polymerized.

Crosslinking accelerators which can be used include phosphorus compounds, especially phosphorous and hypophosphorous acids and their salts.

As well as the constituents mentioned the aqueous polymer dispersions may contain customary additions in accordance with the intended application.

The components optionally present additionally in the aqueous polymer dispersion are normally added after the end of the emulsion polymerization.

To modify various property features of the aqueous polymer dispersions for use in accordance with the invention they may also be mixed with one or more other polymer dispersions, polymer solutions or polymer powders.

A further possibility for modification is the admixing of further mixing components, including organic components, such as epoxy-functional components, formaldehyde resins, components having isocyanate groups or urethane groups, amino-, carboxy- or hydroxyfunctionalized mono-or disilane and/or -siloxane compounds, or other, substituted or unsubstituted hydrocarbon compounds.

Furthermore it is also possible to add inorganic components to aqueous polymer dispersions (fillers, rheological additives, adhesion promoters, crosslinking accelerators, etc.). Examples include pigments, fillers, salts, and oxides.

Where appropriate, two or more of the aforementioned mixing components may also be present simultaneously in the polymer dispersions for use in accordance with the invention.

The aqueous polymer dispersions may further comprise customary additions in accordance with the intended application. By way of example they may comprise bactericides or fungicides. Further, they may comprise hydrophobicizing agents for increasing the water resistance of the treated substrates. Suitable hydrophobicizing agents are customary aqueous paraffin dispersions or silicones. The compositions may further comprise wetting agents, thickeners, plasticizers, retention agents, pigments, and fillers. One way in which these fillers can be mixed in is by induction heating, which facilitates the curing process.

Over and above this it can be advisable, for more rapid crosslinking at lower temperatures, to add certain epoxide compounds as well, examples being difunctional or trifunctional glycidyl ethers such as bisphenol A diglycidyl ether or butanediol diglycidyl ether, i.e., in particular, aromatic and aliphatic glycidyl ethers. Suitable epoxide compounds, furthermore, are cycloaliphatic glycidyl compounds, heterocyclic glycidyl compounds, and cycloaliphatic epoxy resins.

Finally the aqueous polymer dispersions may comprise customary flame retardants, such as aluminum silicates, aluminum hydroxides, borates and/or phosphates.

Frequently the aqueous polymer dispersions also comprise coupling reagents, such as alkoxysilanes, e.g., 3-aminopropyltriethoxysilane, soluble or emulsifiable oils as lubricants and dust-binding agents, and also wetting assistants.

The aqueous polymer dispersions can also be used as a blend with other binders, such as urea-formaldehyde resins, melamine-formaldehyde resins or phenol-formaldehyde resins, for example, and also with epoxy resins.

The aqueous polymer dispersions are formaldehyde-free. Formaldehyde-free means that the compositions of the invention contain no significant amounts of formaldehyde and that no significant amounts of formaldehyde are released on drying and/or curing either. In general the compositions contain <100 ppm formaldehyde.

The formaldehyde-free aqueous polymer dispersions are substantially uncrosslinked and therefore thermoplastic prior to application. If necessary, however, a small degree of precrosslinking of the polymer A1 can be attained, by the use of monomers having two or more polymerizable groups, for example.

The aqueous dispersions for use in accordance with the invention are composed essentially of finely divided emulsion polymer particles of A1 and an aqueous phase containing the polymer A2 and also any amine added separately or unreacted in the esterification, and also, where appropriate, further, water-soluble additives, e.g., crosslinkers.

It is also possible for superordinate structures to form in the aqueous phase, such as lyotropic phases formed by lamellar or spherical aggregates, for example.

The monomer composition is inventively so chosen that for the polymer A1 the resultant glass transition temperature, Tg, is in the range from −20° C. to +35° C., in particular from −20 to +30° C., preferably from −20 to +25° C. The glass transition temperature, Tg, of the polymer can be determined in a known way, for example, by means of Differential Scanning Calorimetry (DSC). The Tg can also be calculated approximately by means of the Fox equation. According to Fox T. G., Bull. Am. Physics Soc. 1, 3, page 123 (1956) it is the case that: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in kelvins, of the homopolymers of the monomer n. Tg values for homopolymers are listed in Polymer Handbook, 3rd Edition, J. Wiley & Sons, New York (1989).

It is advisable here to use as polymers A1 copolymers based on a hard comonomer, such as styrene or else methyl methacrylate, or acrylonitrile, for example, having a glass transition temperature of from 65 to 165° C., and on a soft comonomer, such as n-butyl acrylate or else 2-ethylhexyl acrylate, or ethyl acrylate, for example, having a glass transition temperature of from −65 to −10° C. Particular preference is given to using styrene and n-butyl acrylate. In this case care must be taken to ensure that the resultant copolymer has a glass transition temperature of from −20 to +35° C. A higher or lower glass transition temperature outside the temperature range to be set inventively for the polymer A1 leads to inferior mechanical properties.

The aqueous polymer dispersions for use in accordance with the invention are finely divided, stable latices. The weight-average particle size of the latex particles is approximately from 10 to 1500 nm, preferably from 20 to 1000 nm, more preferably from 30 to 500 nm, measured by means of an analytical ultracentrifuge (AUC).

The aqueous polymer dispersions for use in accordance with the invention are infinitely dilutable with water or with dilute salt or surfactant solutions without causing the latex particles to coagulate. They have a nonvolatiles content (solids content) in the range from about 20 to 75% by weight, preferably from 25 to 65% by weight. The viscosity (for a solids content of 40% by weight) is generally within a range from about 10 to 4000 mPas, measured with a rotation viscometer in accordance with DIN 53019 at 23° C. and at a shear rate of 250 s$^{-1}$.

The aqueous polymer dispersions for use in accordance with the invention can also be diluted with water before being added to the abrasive materials. Further it can be advantageous to apply the aqueous polymer dispersions as a blend with water-compatible solvents such as alcohols, especially methanol, ethanol or the like. The aqueous polymer dispersions generally possess good compatibility toward these solvents.

The aqueous polymer dispersions described are used in accordance with the invention as binders in the production of abrasive materials, particularly abrasive paper, abrasive cloth or abrasive articles. In this context it can be advisable to adjust the aqueous polymer dispersions to a pH of from 3 to 8, in particular from 3 to 5, by adding various organic or inorganic bases, before applying the dispersions to the corresponding paper or cloth or to the corresponding article. Suitable bases include ammonia, organic monofunctional or polyfunctional amines, alkoxides, and metal alkyl compounds, but also inorganic bases such as sodium hydroxide or sodium carbonate, for example.

The likewise inventive abrasive materials obtainable in this way normally contain abrasive grit, based for example on corundum, quartz, garnet, pumice, tripel, silicon carbide, emery, aluminas, zirconias, kieselguhr, sand, gypsum, boron carbide, borides, carbides, nitrides, cerium oxide or silicates.

Ways of producing the abrasive materials of the invention include the application first to the paper, craft or article in question of the aqueous binder dispersions described, followed by the addition of the chosen abrasive grit and, finally, by the addition of further quantities of the aqueous polymer dispersions described, referred to as size coat.

The inventive use of the aqueous polymer dispersion results in improved abrasive material which features qualities including high flexibility, toughness/elasticity, breaking forces, and breaking extension, which possess favorable abrasion behavior, and in which the abrasive grit is effectively bound.

In addition the polymer dispersions of the invention can be used as scouring pads. By scouring pads are meant, for example, scouring, abrading, and polishing pads, e.g., pan cleaners or Scotch Brite. They are preferably consolidated using phenol- or melamine-formaldehyde resins. The principal quality criteria are the hard hand, the resistance to boiling water (pad must not become soft) and the retention of abrasive grain in service. The environmental burden and lack of occupational hygiene involved in using phenolic and/or melamine resins is problematic.

With the binders claimed, very good results are achieved in respect of thermal stability in hot water, along with excellent retention of abrasive grain. It is additionally possible to mix in further dispersions.

(Spray) consolidation of a base web brings the following advantages:

absence of formaldehyde no notable odor nuisance during production (during spraying/in the dryer/dryer exit)

relatively high thermal stability in hot water (low thermoplasticity)

phenolic-resinlike character (excellent scouring effect wet and dry)

odorless spraying compound (no ammonia needed for stabilization)

EXAMPLES

I. Preparation of the Polymer Dispersion for Use

Example 0

Preparation of Carboxyl-containing Polymer A2

A pressure reactor with anchor stirrer was charged with 0.55 kg of fully demineralized water, 0.36 kg of maleic anhydride and 0.91 kg of a 40% strength by weight aqueous solution of an ethoxylated oleylamine (average degree of ethoxylation=12, e.g., Lutensol® FA grades from BASF AG). This initial charge was heated to 125° C. under a nitrogen atmosphere. After it had reached this temperature a feed stream 1, consisting of 0.75 kg of fully demineralized water and 1.00 kg of acrylic acid, and a feed stream 2, consisting of 0.22 kg of fully demineralized water and 0.12 kg of $H_2O_2$ (30% strength by weight), were metered in at a uniform rate, feed stream 1 over the course of 4 h and feed stream 2 over the course of 5 h. After the end of feed stream 1 a further 0.11 kg of fully demineralized water was added and the solution was cooled to room temperature. The aqueous polymer solution thus obtained has a solids content of 43.0%, a pH of 1.7, and a viscosity of 450 mPas. The K value is 13.3.

The nonvolatile fractions (SC) were determined in a forced-air drying cabinet from the weight loss of a 1 g sample dried at 120° C. for two hours.

The viscosity of the mixtures/emulsions was determined in a Brookfield viscometer at a shear rate of 250 s$^{-1}$ in accordance with DIN53019 at 23° C.

The pH was measured using a handylab 1 pH meter from Schott.

The K value of the polymer A2 was determined by the method of Fikentscher (DIN 53726).

Example 1

Preparation of the Polymer Dispersion from the Polymer A1 and the Polymer A2

A 4 l glass vessel with anchor stirrer (120 rpm) was charged with 750 g of water and 10% by weight of a feed stream 4 and this initial charge was heated to 90° C. After 2 minutes, at this temperature, a feed stream 3 was metered in over the course of 3 h and, at a separate location, the remainder of feed stream 4 over the course of 3.5 h. The reaction mixture was subsequently stirred at this temperature for 30 minutes and cooled. The polymer dispersion prepared in this way contains 49.2% by weight nonvolatiles and has a pH of 1.8. The viscosity of the polymer dispersion obtained is 1080 mPas (250 s$^{-1}$) and the glass transition temperature of the polymer is 14° C.

Then 357 g of an aqueous solution (50% by weight) of 2,2',2"-nitrilotriethanol were added (see comparative example A). The pH of th mixture is 3.5.

Feed Stream 3

| | |
|---|---|
| 2326 g | the carboxyl-containing polymer A2 from example 0 (43% strength by weight) |
| 500 g | styrene |
| 450 g | n-butyl acrylate |
| 50 g | 2-hydroxyethyl acrylate |

Feed Stream 4

| | |
|---|---|
| 60 g | fully demineralized water |
| 3.0 g | sodium peroxodisulfate |

Comparative Example A

A 4 l glass vessel with anchor stirrer (12 rpm) was charged with 478 g of water and 10% by weight of a feed stream 4 and this initial charge was heated to 90° C. After 2 minutes, at this temperature, a feed stream 3 was metered in over the course of 3 h and, at a separate location, the remainder of feed stream 4 over the course of 3.5 h. The reaction mixture was subsequently polymerized further at this temperature for 30 minutes and cooled. The polymer dispersion prepared in this way contains 50.9% by weight nonvolatiles and has a pH of 2.0. The viscosity of the polymer dispersion obtained is 2060 mPas (250 s$^{-1}$) and the glass transition temperature of the polymer is −43° C. Then 322 g of an aqueous solution (50% by weight) of 2,2',2"-nitrilotriethanol were added. The pH of the mixture is 3.5.

Feed Stream 3

| | |
|---|---|
| 2098 g | the acid polymer from example 0 (43% strength by weight) |
| 855 g | n-butyl acrylate |
| 45 g | 2-hydroxyethyl acrylate |

Feed Stream 4

| | |
|---|---|
| 60 g | fully demineralized water |
| 2.7 g | sodium peroxodisulfate |

Comparative examples B to E were prepared in analogy to example 1 using the stated polymer/monomer combinations; in other words, the copolymer (polymer A1) indicated in each case in Table 1 was prepared in the presence of the carboxyl-containing polymer A2 from example 0.

TABLE 1

| | Copolymer (polymer A1) | Tg (calc.) [° C.] | SC [%] | Viscosity [mPas, 250 s$^{-1}$] | pH |
|---|---|---|---|---|---|
| Comparative example A | (95BA/5HEA) | −43 | 50.9 | 2060 | 3.5 |
| Comparative example B | (80EHA/20MMA) | −50 | 48.5 | 1110 | 3.4 |
| Comparative example C | (80BA/20AN) | −23 | 49.2 | 1120 | 3.5 |
| Comparative example D | (60BA/30EA/10S) | −24 | 49.1 | 1110 | 3.3 |
| Comparative example E | (72S/26MMA/2MAS) | 107 | 49.3 | 755 | 3.4 |
| Example 1 | (50S/45BA/5HEA) | 14 | 49.2 | 1080 | 3.5 |

Key:

| | |
|---|---|
| S: styrene | BA: n-butyl acrylate |
| HEA: hydroxyethyl acrylate | EHA: ethylhexyl acrylate |
| AN: acrylonitrile | MAS: methacrylic acid |
| Tg (calc.): calculated glass transition temperature | SC: solids content |
| | MMA: methyl methacrylate |
| pH: pH | EA: ethyl acrylate |

II. Production of an Abrasive Paper and Results of Measurements

The polymer dispersions obtained in the inventive example 1 and also the comparative examples A to E were used to produce abrasive papers in accordance with the following construction:

Make coat: binder applied at 20 g/m$^2$, dried at 90° C. for 10 min

Grain: corundum, grain size 60

Size coat: binder applied at 60 g/m$^2$, dried at 90° C. for 10 min and at 170° C. for 30 min Table 2 below shows the breaking strength (breaking force and breaking extension) and the abrasion of steel for the inventive example 1 and for the comparative examples A to E.

TABLE 2

| | Breaking force [N/mm$^2$] | Breaking extension [%] | Abrasion - steel [%] |
|---|---|---|---|
| Comparative example A | 35.2 | 12.0 | 0.5 |
| Comparative example B | 30.7 | 10.7 | 0.49 |
| Comparative example C | 43.0 | 13.0 | 0.49 |
| Comparative example D | 34.4 | 10.0 | 0.43 |
| Comparative example E | 26.5 | 10.0 | 0.32 |
| Example 1 | 44.9 | 24.0 | 0.65 |

The breaking strength (breaking force and breaking extension) was determined in accordance with DIN 53455, the details being as follows:

| | |
|---|---|
| Apparatus: | silicone rubber film plate |
| | internal dimensions 145 × 145 × 5 mm |
| | brass sieve, mesh size 0.16 mm |
| | plate storage rack with spirit level allowing horizontal placement |
| Storage: | after drying in the plate |
| | # 18.17.01 7 d under StC (23° C./50% rel. AH) |
| | # 18.17.02 7 d under StC + 3 d wet storage |
| Sample dimensions: | 5 test dumbbells with a test length of 40 mm and a test width of 4 mm (DIN 53455) |
| Testing speed: | 200 mm/min |
| Testing temperature: | StC = standard conditions |
| Method: | The film plate is inserted into the plate storage rack. For a 50% dispersion approximately 35 g are weighed in, diluted with 25 g of water, poured into the film plate through the brass sieve, without bubbles, and distributed uniformly. The thickness of the test specimen is ascertained by means of a layer thickness gauge. |
| Evaluation: | breaking extension in % |
| | maximum force in N/mm$^2$ |

The determination of the abrasion of steel (abrasive on underlay) was made in accordance with the following conditions:

| | |
|---|---|
| Substrate: | abrasive paper, impregnated |
| Sample dimensions: | approx. 50 × 250 mm |
| Number of test specimens: | 3 |
| Apparatus: | top pan quick balance |
| | analytical balance |
| | coating platform |
| | abrasion device APG 100/20 (from Maag u. Schank Gomaringen) |
| Drying: | make coat 3 minutes, 90° C. |
| | size coat 10 minutes, 90° C. |
| Crosslinking: | as specified |
| Method: | The impregnated side of the Gessner paper is coated with a make coat on the coating platform and the abrasive grain is scattered into the wet film, followed by drying at 90° C. for 3 minutes. |
| | The size coat is applied to the dried coating using a rubber roller or by spray application and is dried at 90° C. for 10 minutes. The overall system is subsequently crosslinked at 150° C. for 30 minutes or as specified. |
| | The sample strips are cut from the abrasive paper thus produced. To test the abrasion, test specimens of PVC, beech, steel or as specified, with dimensions of 40 × 20 × 5 mm, are used. |
| | A 20 × 5 mm area of the test specimens is subjected to abrasion under a load of 1 kg with 500 strokes, in which the abrasive paper is moved back and forth below the test specimen over a length of 10.5 cm. The abrasion of test specimen and paper serves as a measure of the quality of the binder. |

Evaluation: Mass of Test Specimen Before Test—Mass of Test Specimen After Test×100 in % Mass of Test Specimen Before Test Production of a Scouring Pad and Results of Measurements Base material: 22 dtex nylon web; cross-laid approx. 100–120 g/m$^2$ First of all the nylon web base is presprayed on both sides with the binder (solids application: max. 10 g/m$^2$ per side) and predried at 120° C. This gives the web the necessary stability for the subsequent (main) spray passes. Thereafter the target total application rate is applied by spraying in two or more (2–3) passes (per web side) with intermediate drying (at 120° C.) in accordance with the desired abrasive effect and/or intended use.

In order to obtain optimum abrasive grain retention and/or scouring strength, it is necessary to carry out crosslinking at 180–200° C. for about 3–5 min after the final application rate has been reached.

| Additives/Additions: | Trial 1 Comparative example [parts by wt.] | Trial 2 [parts by wt.] | Trial 3 [parts by wt.] |
|---|---|---|---|
| Water | 60 | 50 | 50 |
| Agitan 281 defoamer | 0.2 | 0.2 | 0.2 |
| Saduren ® 163 (BASF AG) | 60 | — | — |
| Aqueous ammonia, 25% strength | 2–3 | — | — |
| Example 1 (50S/45 BA/5 HEA) | — | 100 | 80 |
| Acrylate dispersion (copolymer 52.5 EA, 28 AN, 15 BA, 2.6 AM, 1.9 Amol, Tg = 39° C.) | 100 | — | 20 |
| Silicon carbide F180 | 75 | 75 | 75 |
| Silicon carbide F120 | 25 | 25 | 25 |
| Collacral ® PU 85 (BASF AG) | 9 | 1 | 1 |
| Solids content, spray compound: approx.: | 59–60% | 59–60% | 59–60% |
| pH: | 9.5–10 | 3.5 | 3.5 |
| VT02 spindle 3: approx.: | 150 mPa × s | 180 mPa × s | 180 mPa × s |
| Predrying per spray pass: | 2 min/120° C. | 2 min/120° C. | 2 min/120° C. |
| Crosslinking: | 5 min/200° C. | 3 min/200° C. | 3 min/200° C. |
| Total solids application rate, approx.: | 320% | 320% | 320% |
| Thermal stability in H₂O (80° C., 10 min): | Comparison | Better than comparison | Better than comparison |
| Abrasive grain retention | good | good | good |

Leaching loss/hot water resistance:

| Conditions: | Test specimens are agitated using a magnetic stirrer in hot water at 80° C. in a 2 L glass beaker for 30 minutes, then dried at 120° C. and weighed again. Report: weight loss in % |
|---|---|
| Trial 1 | −1.6% |
| Trial 2 | +/−0% |
| Trial 3 | +/−0% |

Abrasion characteristics:

| Loading: | 20N, 5000 revolutions each time, addition of 2 ml abrasive (2 parts by weight Stahlfix and 1 part by weight water), determination of abrasion in % |
|---|---|

Trial 1 (Comparative example):

| | 5000 revolutions | 10000 revolutions | 15000 revolutions |
|---|---|---|---|
| Metal sheet | 0.034 | 0.042 | 0.059 |
| Pad | 0.563 | 1.415 | 1.945 |

Trial 2:

| | 5000 revolutions | 10000 revolutions | 15000 revolutions |
|---|---|---|---|
| Metal sheet | 0.021 | 0.038 | 0.042 |
| Pad | 0.101 | 0.361 | 0.578 |

Trial 3:

| | 5000 revolutions | 10000 revolutions | 15000 revolutions |
|---|---|---|---|
| Metal sheet | 0.021 | 0.034 | 0.042 |
| Pad | 0.530 | 1.045 | 1.809 |

We claim:

1. A method, comprising:
mixing an aqueous polymer dispersion and an abrasive grit to form a grit mixture, then
drying the grit mixture to form an abrasive material,
wherein the aqueous polymer dispersion comprises dispersed particles of at least one polymer A1 having a glass transition temperature Tg of from −20° C. to +35° C. and obtained by free-radical emulsion polymerization in the presence of a polymer A2, wherein the polymer A2 comprises polymerized units of
from 50 to 99.5% by weight of at least one of an ethylenically unsaturated monocarboxylic acid and an ethylenically unsaturated dicarboxylic acid whose carboxylic groups can form an anhydride group, or mixtures thereof,
from 0.5 to 50% by weight of at least one ethylenically unsaturated compound selected from the group consisting of an ester of an ethylenically unsaturated monocarboxylic acid, a monoester of an ethylenically unsaturated dicarboxylic acid and a diester of an ethylenically unsaturated dicarboxylic acid with an amine containing at least one hydroxyl group, and
up to 20% by weight of at least one further monomer.

2. The method as claimed in claim 1, wherein the polymer A2 comprises polymerized units of at least one monomer selected from the group consisting of a $C_3$–$C_{10}$ monocarboxylic acid and a $C_4$–$C_8$ dicarboxylic acid.

3. The method as claimed in claim 1 wherein the amine containing at least one hydroxyl group is at least one amine of formula (I)

$$R^c NR^a R^b \quad (I)$$

where

R$^c$ is at least one of a C$_6$ to C$_{22}$ alkyl, a C$_6$ to C$_{22}$ alkenyl, an aryl-C$_6$–C$_{22}$ alkyl or an aryl-C$_6$–C$_{22}$ alkenyl, wherein the alkenyl radical has 1 to 3 nonadjacent double bonds, R$^a$ is at least one of an hydroxy-C$_1$–C$_6$ alkyl or a radical of formula II $$—(CH_2CH_2O)_x(CH_2CH(CH_3)O)_y—H \qquad (II)$$

wherein the sequence of the alkylene oxide units is arbitrary and x and y independently of each other are an integer from 0 to 100, and the sum of x and y is >1, R$^b$ is at least one of hydrogen, a C$_1$ to C$_{22}$ alkyl, a hydroxy-C$_1$–C$_6$ alkyl, a C$_6$ to C$_{22}$ alkenyl, an aryl-C$_6$–C$_{22}$ alkyl, an aryl-C$_6$–C$_{22}$ alkenyl or a C$_5$ to C$_8$ cycloalkyl, wherein the alkenyl radical has 1 to 3 nonadjacent double bonds, or R$^b$ is a radical of formula III $$—(CH_2CH_2O)_v(CH_2CH(CH_3)O)_w—H \qquad (III)$$

wherein the sequence of the alkylene oxide units is arbitrary and v and w independently of each other are an integer from 0 to 100.

4. The method as claimed in claim 1 wherein the weight ratio based on solids of polymer A1 to polymer A2 is in the range from 7:1 to 1:7.

5. The method as claimed in claim 1, wherein the weight ratio based on solids of polymer A1 to polymer A2 is in the range of from 3:1 to 1:3.

6. The method as claimed in claim 1, wherein the polymer A2 further comprises an alkanolamine crosslinker having at least two hydroxyl groups.

7. The method as claimed in claim 1, wherein the polymer A1 has a glass transition temperature of from −20 to +30° C.

8. The method as claimed in claim 1, wherein the polymer A1 is at least one copolymer comprising a hard comonomer block having a glass transition temperature of from 65 to 165° C. and a soft comonomer block having a glass transition temperature of from −65 to −10° C.

9. The method as claimed in claim 1, further comprising: adjusting the pH of the grit mixture to from 2 to 8 by adding one or more of an organic base and an inorganic base.

10. The method as claimed in claim 1, further comprising: mixing the grit mixture with one or more of an organic polymeric mixing component or an inorganic polymeric mixing component in at least one of a dissolved form or a dispersed form.

11. An abrasive paper comprising an abrasive material obtained by the method of claim 1 and a paper substrate, wherein the abrasive material is present on at least one surface of the paper.

12. An abrasive cloth comprising the abrasive mixture obtained by the process of claim 1 and a cloth, wherein the abrasive material is present on the surface of the cloth or the cloth is present in a matrix of the abrasive material.

13. A scouring pad comprising an abrasive material obtained by the method of claim 1, wherein the abrasive grit is present in a dispersed form in a dried matrix of the aqueous polymer dispersion.

14. An abrasive material, comprising:
a dried mixture comprising an abrasive grit and an aqueous polymer dispersion comprising dispersed particles of at least one polymer A1 having a glass transition temperature Tg of from −20° C. to +35° C. and obtained by free-radical emulsion polymerization in the presence of a polymer A2 comprising polymerized units of
from 50 to 99.5% by weight of at least one of an ethylenically unsaturated monocarboxylic acid and an ethylenically unsaturated dicarboxylic acid whose carboxylic groups can form an anhydride group, or mixtures thereof,
from 0.5 to 50% by weight of at least one ethylenically unsaturated compound selected from the group consisting of an ester of an ethylenically unsaturated monocarboxylic acid, a monoester of an ethylenically unsaturated dicarboxylic acid and a diester of an ethylenically unsaturated dicarboxylic acid with an amine containing at least one hydroxyl group, and
up to 20% by weight of at least one further monomer.

15. The abrasive material as claimed in claim 9, wherein the polymer A2 comprises polymerized units of at least one of a C$_3$–C$_{10}$ monocarboxylic acid and a C$_4$–C$_8$ dicarboxylic acid.

16. The abrasive material as claimed in claim 14, wherein the amine containing at least one hydroxyl group is at least one amine of formula (I)

$$R^cNR^aR^b \qquad (I)$$

where

R$^C$ is at least one of a C$_6$ to C$_{22}$ alkyl, a C$_6$ to C$_{22}$ alkenyl, an aryl-C$_6$–C$_{22}$ alkyl or an aryl-C$_6$–C$_{22}$ alkenyl, wherein the alkenyl radical has 1 to 3 nonadjacent double bonds, R$^a$ is at least one of a hydroxy-C$_1$–C$_6$ alkyl or a radical of formula II $$—(CH_2CH_2O)_x(CH_2CH(CH_3)O)_y—H \qquad (II)$$

where the sequence of the alkylene oxide units is arbitrary and x and y independently of each other are an integer from 0 to 100, and the sum of x and y is >1, R$^b$ is at least one of hydrogen, a C$_1$ to C$_{22}$ alkyl, a hydroxy-C$_1$–C$_6$ alkyl, a C$_6$ to C$_{22}$ alkenyl, an aryl-C$_6$–C$_{22}$ alkyl, an aryl-C$_6$–C$_{22}$ alkenyl or a C$_5$ to C$_8$ cycloalkyl, wherein the alkenyl radical has 1 to 3 nonadjacent double bonds, or R$^b$ is a radical of formula III $$—(CH_2CH_2O)_v(CH_2CH(CH_3)O)_w—H \qquad (III)$$

where the sequence of the alkylene oxide units is arbitrary and v and w independently of each other are an integer from 0 to 100, and mixtures thereof.

17. The abrasive material as claimed in claim 9, wherein the weight ratio based on solids of polymer A1 to polymer A2 is in the range from 7:1 to 1:7.

18. The abrasive material as claimed in claim 14, wherein the weight ratio based on solids of polymer A1 to polymer A2 is in the range from 3:1 to 1:3.

19. The abrasive material as claimed in claim 14, wherein the polymer A2 further comprises an alkanolamine crosslinker having at least two hydroxyl groups.

20. The abrasive material as claimed in claim 14, wherein the polymer A1 has a glass transition temperature of from −20° C. to +30° C.

21. The abrasive material as claimed in claim 14, wherein the polymer A1 is at least one copolymer having a hard comonomer having a glass transition temperature of from 65 to 165° C., and a soft comonomer having a glass transition temperature of from −65 to −10° C.

22. The abrasive material as claimed in claim 14, further comprising:
one or more organic or inorganic, polymeric mixing components in dissolved or dispersed form.

23. An abrasive paper, comprising:
the abrasive material of claim 14, and a paper substrate, wherein the abrasive material is present on at least one surface of the substrate paper.

24. An abrasive cloth, comprising:
the abrasive material of claim 14 and a cloth, wherein the dried aqueous polymer dispersion is present on a surface of the cloth or the cloth is embedded in a matrix of the dried aqueous polymer dispersion.

25. A scouring pad, comprising:
the abrasive material of claim 14, wherein the abrasive grit is present dispersed in the matrix of the dried abrasive material.

* * * * *